(12) United States Patent
Sheng

(10) Patent No.: US 9,352,491 B2
(45) Date of Patent: May 31, 2016

(54) ENCAPSULATION MOLD

(71) Applicant: SAINT-GOBAIN GLASS FRANCE, Courbevoie (FR)

(72) Inventor: Pingchun Sheng, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/424,782

(22) PCT Filed: Nov. 5, 2013

(86) PCT No.: PCT/CN2013/086561
§ 371 (c)(1),
(2) Date: Feb. 27, 2015

(87) PCT Pub. No.: WO2014/067495
PCT Pub. Date: May 8, 2014

(65) Prior Publication Data
US 2015/0224677 A1    Aug. 13, 2015

(30) Foreign Application Priority Data
Nov. 5, 2012 (CN) .......................... 2012 2 0577801

(51) Int. Cl.
*B29C 33/20* (2006.01)
*B29C 45/14* (2006.01)
*B29L 31/30* (2006.01)

(52) U.S. Cl.
CPC ............ *B29C 33/20* (2013.01); *B29C 45/14377* (2013.01); *B29C 45/14434* (2013.01); *B29C 45/14778* (2013.01); *B29L 2031/3052* (2013.01)

(58) Field of Classification Search
CPC .................. B29C 45/14434; B29C 45/14478; B29C 45/14377; B29L 2031/3052
USPC .......................................... 425/116; 264/252
See application file for complete search history.

(56) References Cited

U.S. PATENT DOCUMENTS 4,584,155 A * 4/1986 Zanella ............... B29C 33/0044
264/252
4,830,804 A * 5/1989 Weaver ............. B29C 45/14377
264/139

(Continued)

FOREIGN PATENT DOCUMENTS

CA    1259090 A    9/1989
CN    2478824 Y    2/2002

(Continued)

OTHER PUBLICATIONS

International Search Report and Written Opinion of the International Searching Authority issued for International Patent Application No. PCT/CN2013/086561, dated Feb. 6, 2014.

(Continued)

*Primary Examiner* — Robert B Davis
(74) *Attorney, Agent, or Firm* — Pillsbury Winthrop Shaw Pittman LLP

(57) ABSTRACT

An encapsulation mold is provided, which may include an upper mold, a lower mold and a clamping device. The clamping device includes a rubber anti-slip block fixed to a joint surface of the upper mold, and a rubber anti-slip block fixed to a joint surface of the lower mold, wherein both of the rubber anti-slip blocks can fix the glass tightly. Therefore, after the upper mold and the lower mold are pressed against each other, these rubber anti-slip blocks may deform and apply a couple of forces having opposite directions to the glass. Under this couple of forces, the glass can be completely fixed in the encapsulation mold, which can avoid glass to be crushed caused by glass moving during injection molding. Meanwhile, because these rubber anti-slip blocks are elastic, they can play an anti-slip role and prop the glass, which may prevent the glass 40 from breakage.

11 Claims, 11 Drawing Sheets

(56) References Cited

U.S. PATENT DOCUMENTS

| | | | | |
|---|---|---|---|---|
| 4,839,122 | A | * | 6/1989 | Weaver ............... B29C 33/0044 264/129 |
| 4,951,927 | A | * | 8/1990 | Johnston ................... E06B 3/20 264/129 |
| 5,068,076 | A | * | 11/1991 | Weaver ............. B29C 45/14016 264/139 |
| 5,413,748 | A | * | 5/1995 | Garza ................. B29C 33/0072 264/135 |
| 6,572,355 | B1 | * | 6/2003 | Bauman ............ B29C 45/14434 249/155 |
| 2002/0132022 | A1 | | 9/2002 | Stangl et al. |
| 2007/0254139 | A1 | * | 11/2007 | Seebass .............. B29C 33/0044 428/172 |

FOREIGN PATENT DOCUMENTS

| | | |
|---|---|---|
| CN | 2712601 Y | 7/2005 |
| CN | 102431123 A | 5/2012 |
| CN | 202895600 U | 4/2013 |

OTHER PUBLICATIONS

First Office Action as issued in Canadian Patent Application No. 2,881,287, dated Mar. 3, 2016.

* cited by examiner

ENCAPSULATION MOLD

CROSS-REFERENCE TO RELATED APPLICATIONS

The present application is the U.S. National Stage of PCT/CN2013/086561, filed Nov. 5, 2013, which in turn claims priority to Chinese patent application No. 201220577801.0, filed on Nov. 5, 2012, and entitled "Encapsulation Mold", the entire disclosure of both applications being incorporated herein by reference.

TECHNICAL FIELD

The present disclosure generally relates to an encapsulation mold for encapsulating glass.

BACKGROUND OF THE DISCLOSURE

Encapsulated glass is one kind of safety glass, which is widely used in automobiles as front windshield glass, rear windshield glass, skylight glass or quarter window glass. Encapsulated glass may have the following advantages: 1, encapsulated glass can be bonded to a car body tightly, which guarantees sealing of the car; 2, glass is combined with encapsulating plastics in one piece, which makes it easy to install, thereby shortening the installation cycle and improving the production efficiency; meanwhile, encapsulated glass may have different types of cross section, which can be designed to make a car more aesthetic.

Encapsulated glass may be fabricated as follows. First, a piece of normal annealed glass is pre-processed such as by cutting, edging and cleaning. Second, the pre-processed annealed glass is transferred to a production line for toughening treatment, so as to obtain a piece of toughened glass. Then, an encapsulation mold, including an upper mold and a lower mold, is provided. The toughened glass is placed as an insert on a chuck of the lower mold, and is fixed with a positioning device of the lower mold. Then the upper mold and the lower mold are jointed together. Through a sprue gate, molten plastics are injected towards edges of the toughened glass. An encapsulated glass is obtained after the molten plastics are solidified and encapsulate the edges of the toughened glass.

From above, for a given toughened glass, quality of an encapsulated glass mainly depends on the encapsulating process, in which an encapsulation mold plays a critical role to ensure the quality of the encapsulating process. While injection molding is performed on the toughened glass, the toughened glass may move under huge impacts, which in turn causes the toughened glass to be crushed or scratched. Accordingly, a clamping device, which is disposed in the encapsulation mold, is needed to prevent the toughened glass from moving. Currently, a movable lifter is usually used as the clamping device.

FIG. 1 schematically illustrates a piece of glass fixed by a movable lifter. Referring to FIG. 1, a glass 1 which is to be encapsulated has a convex surface 11 (namely, an upper surface of the glass 1) and a concave surface 12 (namely, a lower surface of the glass 1), which are disposed opposite to each other. A movable lifter 2 is disposed on a lower mold (not shown). The glass 1 may be fixed in an encapsulation mold (not shown) according to the following steps. The glass 1 is firstly placed on the movable lifter 2, which brings the concave surface 12 into contact with the movable lifter 2. After that, the glass 1 is positioned preliminarily. Then an upper mold (not shown) is pressed against the lower mold. The movable lifter 2 applies a first upward force to the concave surface 12, while the upper mold applies a second downward force to the convex surface 11. Under the combined actions of the first upward force and the second downward force, the glass 1 is clamped between the movable lifter 2 and the upper mold, which may prevent the glass 1 from moving during injection molding.

To enable the glass 1 to bear huge impacts during injection molding, the position of the movable lifter 2 can be adjusted up and down. The movable lifter 2 is made of iron and is hard. The movable lifter 2 has a convex surface corresponding to the concave surface 12 of the glass 1. Most part of the concave surface 12 of the glass 1 is propped by the convex surface of the movable lifter 2, when they are brought into contact. During injection molding, a chamber of the encapsulation mold needs to be kept in a pressure maintaining state, so as to make the plastic material encapsulate edges of the glass 1 tightly. Under the actions of the pressure, the glass 1 and the movable lifter 2 squeeze each other. Because both the glass 1 and the movable filter 2 are rigid, the glass 1 may get crushed.

In addition, glasses from different batches may have different curvature tolerances. If the glass 1 has a large curvature tolerance, the concave surface 12 of the glass 1 may not match the convex surface of the movable lifter 2 well. In this case, most of pressure may concentrate on a certain point of the glass 1, which thereby may cause the glass 1 to be crushed by the movable lifter 2. Especially, when the glass 1 has a big size, a central region of the glass 1 may have a very large curvature tolerance, which may result in high breakage rate of the glass.

SUMMARY

Embodiments of the present disclosure provide an encapsulation mold for manufacturing encapsulated glass, in order to solve problems, such as that, encapsulated glass is easily to be crushed.

In one embodiment, an encapsulation mold is provided, which may include:
an upper mold;
a lower mold; and
a clamping device which may include a first rubber anti-slip block fixed to a joint surface of the upper mold, and a second rubber anti-slip block fixed to a joint surface of the lower mold, wherein the first rubber anti-slip block has a first surface and the second rubber anti-slip block has a second surface, and when the upper mold is pressed against the lower mold, the first rubber anti-slip block and the second rubber anti-slip block overlap at least in part, and a minimum distance between the first rubber anti-slip block and the second rubber anti-slip block is less than a thickness of a glass to be encapsulated.

In some embodiments, the encapsulation mold has equal numbers of the first and second rubber anti-slip blocks.

In some embodiments, the minimum distance between the first rubber anti-slip block and the second rubber anti-slip block may equal to a distance between the first surface of the first rubber anti-slip block and the second surface of the second rubber anti-slip block, and when the upper mold is pressed against the lower mold, the distance between the first surface of the first rubber anti-slip block and the second surface of the second rubber anti-slip block is about 0.15 mm to about 0.25 mm less than the thickness of the glass to be encapsulated.

In some embodiments, the first surface of the first rubber anti-slip block is concave, and the second surface of the second rubber anti-slip block is convex; or, the first surface of the first rubber anti-slip block is convex, and the second surface of the second rubber anti-slip block is concave; wherein a concave one of the first and second surfaces is configured to match a convex surface of the glass to be encapsulated, and a convex one of the first and second surfaces is configured to match a concave surface of the glass to be encapsulated.

In some embodiments, the clamping device is provided with three or more first rubber anti-slip blocks and three or more second rubber anti-slip blocks, and the three or more first rubber anti-slip blocks and the three or more second rubber anti-slip blocks are respectively arranged in a polygon pattern.

In some embodiments, the clamping device may further include a third rubber anti-slip block fixed to the joint surface of the upper mold, and a fourth rubber anti-slip block fixed to the joint surface of the lower mold, and a width of the third rubber anti-slip block and a width of the fourth rubber anti-slip block are less than that of the first rubber anti-slip block and that of the second rubber anti-slip block, respectively; the third rubber anti-slip block has a third surface which is adapted for clamping the glass to be encapsulated, and the fourth rubber anti-slip block has a fourth surface which is adapted for clamping the glass to be encapsulated; the third rubber anti-slip block has a third groove formed therein and the third groove faces outward from the third surface; the fourth rubber anti-slip block has a fourth groove formed therein and the fourth groove faces outward from the fourth surface; when the upper mold is pressed against the lower mold, the third rubber anti-slip block and the fourth rubber anti-slip block overlap at least in part, and a distance between the third surface of the third rubber anti-slip block and the fourth surface of the fourth rubber anti-slip block is less than a thickness of the glass to be encapsulated; and the third rubber anti-slip block is located closer to an edge of the upper mold compared with the first rubber anti-slip block, and the fourth rubber anti-slip block is located closer to an edge of the lower mold compared with the second rubber anti-slip block, and wherein the encapsulation mold has equal numbers of the third and fourth rubber anti-slip blocks.

In some embodiments, when the upper mold is pressed against the lower mold, the distance between the third surface of the third rubber anti-slip block and the fourth surface of the fourth rubber anti-slip block is about 0.15 mm to about 0.25 mm less than the thickness of the glass to be encapsulated.

In some embodiments, the clamping device is provided with three or more third rubber anti-slip blocks and three or more fourth rubber anti-slip block, and the three or more third rubber anti-slip blocks and the three or more fourth rubber anti-slip blocks are distributed along a circumference of a polygon, respectively.

In some embodiments, the third groove and the fourth groove respectively have a substantially V-shaped, square or W-shaped cross section.

In some embodiments, the first rubber anti-slip block is provided with a rubber bump located on and extending from the first surface, and the second rubber anti-slip block is provided with a rubber bump located on and extending from the second surface, and the minimum distance between the first rubber anti-slip block and the second rubber anti-slip block equals to a distance between the surface of the rubber bump of the first rubber anti-slip block and the surface of the rubber bump of the second rubber anti-slip block. When the upper mold is pressed against the lower mold, the first rubber anti-slip block and the second rubber anti-slip block overlap completely, the rubber bump of the first rubber anti-slip block and the rubber bump of the second rubber anti-slip block overlap at least in part, and the distance between the first surface of the first rubber anti-slip block and the second surface of the second rubber anti-slip block equals to the thickness of the glass to be encapsulated.

In some embodiments, the first rubber anti-slip block has a first groove formed on the first surface, and the second rubber anti-slip block has a second groove formed on the second surface; and the rubber bump of the first rubber anti-slip block is embedded in the first groove and extends higher than the first surface, and the rubber bump of the second anti-slip block is embedded in the second groove and extends higher than the second surface.

In some embodiments, the rubber bump embedded in the first groove extends about 0.45 mm to about 0.55 mm higher than the first surface, and the rubber bump embedded in the second groove extends about 0.45 mm to about 0.55 mm higher than the second surface.

Compared with the prior art, this disclosure has the following advantages:

The encapsulation mold provided in embodiments of the present disclosure includes an upper mold, a lower mold and a clamping device, where the clamping device includes a first rubber anti-slip block fixed to a joint surface of the upper mold, and a second rubber anti-slip block fixed to a joint surface of the lower mold, and both of the first rubber anti-slip block and the second rubber anti-slip block have surfaces for clamping a glass to be encapsulated. Therefore, after the upper mold and the lower mold are pressed against each other, both of the first rubber anti-slip block and the second rubber anti-slip block deform and apply a pair of forces having opposite directions to the glass. Under this pair of forces, the glass can be completely fixed in the encapsulation mold, thereby preventing the glass from breakage which is caused by glass moving during injection molding. Meanwhile, because the first and second rubber anti-slip blocks are elastic, they can play a role of buffer, which may prevent the glass from breakage.

Further, the rubber anti-slip blocks can compensate for the curvature tolerance of the glass to be encapsulated, which enables the encapsulation mold to be suitable for glasses from different batches.

When the glass has a big size, the clamping device includes a first rubber anti-slip block and a third rubber anti-slip block fixed to a joint surface of the upper mold, and a second rubber anti-slip block and a fourth rubber anti-slip block fixed to a joint surface of the lower mold, wherein grooves are formed in the third rubber anti-slip block and the fourth rubber anti-slip block, the third rubber anti-slip block is more close to an edge of the upper mold than the first rubber anti-slip block, and the fourth rubber anti-slip block is more close to an edge of the lower mold than the second rubber anti-slip block. In this way, the first rubber anti-slip block and the second rubber anti-slip block may fix a central region of the glass, while the third rubber anti-slip block and the fourth rubber anti-slip block may fix a peripheral region of the glass.

When the glass has a big size, the first rubber anti-slip block and the second rubber anti-slip block may be provided with a rubber bump respectively, where the rubber bumps extend from the surfaces of the first rubber anti-slip block and the second rubber anti-slip block. In this way, the glass can be clamped between the rubber bump of the first rubber anti-slip block and the rubber bump of the second rubber anti-slip block. Because the contact area between the rubber bumps with the glass is small, the forces applied by the rubber bumps to the glass are relatively low, which reduces the breakage rate of the glass. As a result, the glass is not easily to be crushed even if the glass of a big size has a great curvature tolerance.

DETAILED DESCRIPTION OF THE DISCLOSURE

Figure 1:
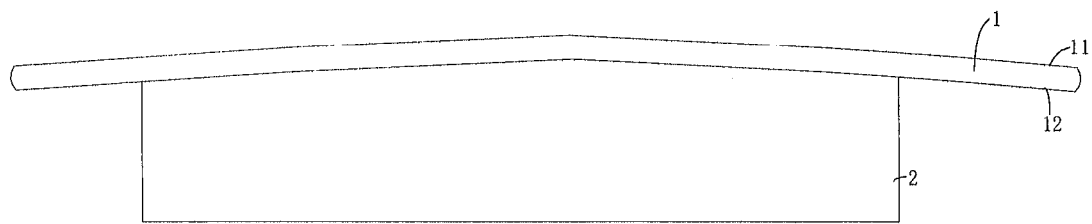
FIG. 1 schematically illustrates a glass fixed by a movable lifter.
Figure 2:
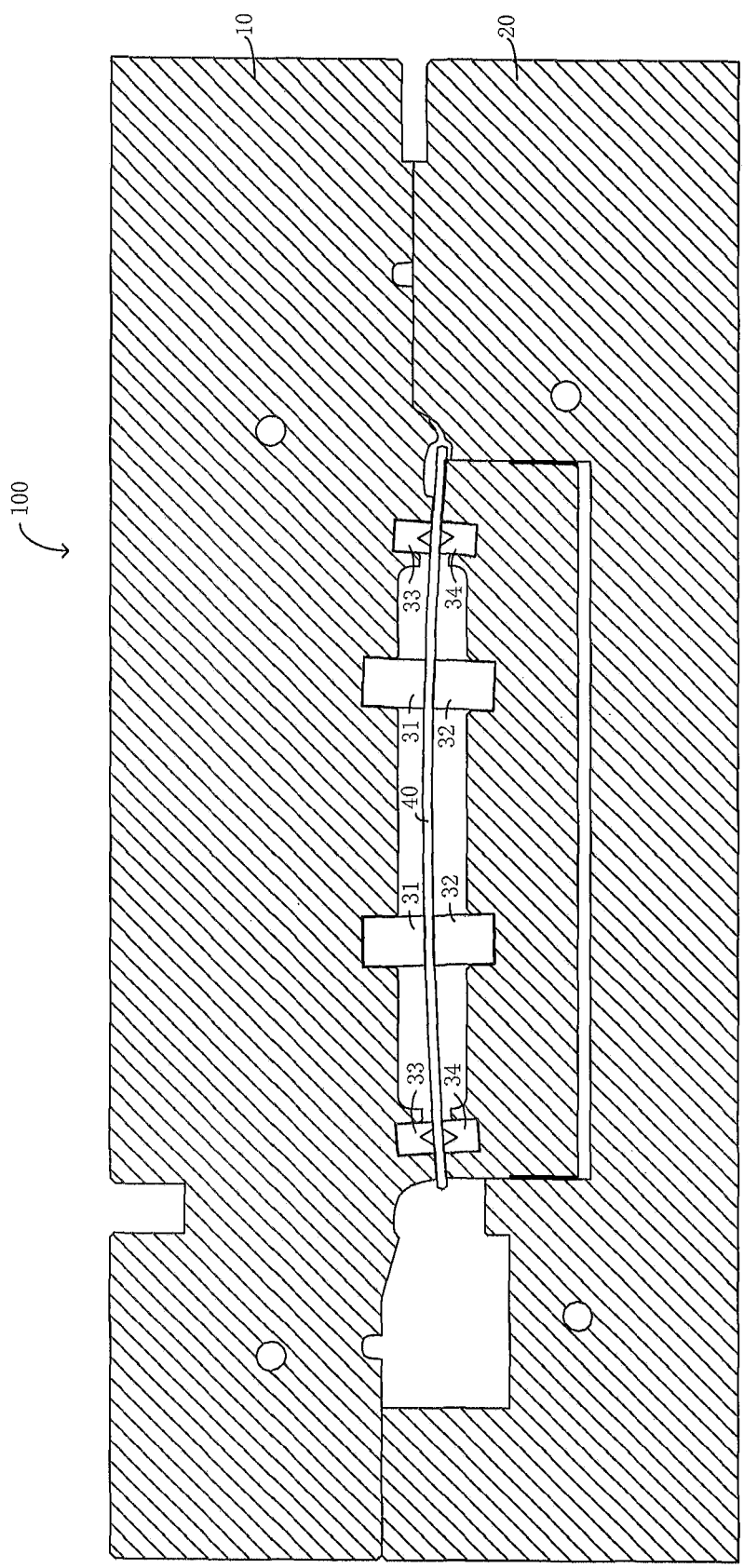
FIG. 2 schematically illustrates a cross-sectional view of an encapsulation mold according to one embodiment of the present disclosure.

In order to clarify the objects, characteristics and advantages of the disclosure, embodiments of the present disclosure will be described in detail in conjunction with the accompanying drawings. The disclosure will be described with reference to certain embodiments. It will be understood by those skilled in the art that various changes may be made without departing from the spirit or scope of the disclosure. Accordingly, the present disclosure is not limited to the embodiments disclosed.

Referring to FIG. 2 to FIG. 6, an encapsulation mold 100 provided in embodiments of the present disclosure may include an upper mold 10, a lower mold 20 and a clamping device. The clamping device may include a first rubber anti-slip block 31 which is fixed to a joint surface of the upper mold 10 and has a first surface 311 for clamping a glass 40 to be encapsulated, and a second rubber anti-slip block 32 which is fixed to a joint surface of the lower mold 20 and has a second surface 321 for clamping the glass 40. In some embodiments, the clamping device has equal numbers of the first rubber anti-slip blocks 31 and the second rubber anti-slip blocks 32. In some embodiments, when the upper mold 10 is pressed against the lower mold 20, the first rubber anti-slip block 31 and the second rubber anti-slip block 32 may overlap at least in part. And a distance between the first surface 311 of the first rubber anti-slip block 31 and the second surface 321 of the second rubber anti-slip block 32 is less than a thickness of the glass 40 (namely, a design thickness of the glass 40). If an encapsulation width of an upper surface of the glass 40 equals to that of a lower surface of the glass 40, the first rubber anti-slip block 31 and the second rubber anti-slip block 32 overlap completely. If the encapsulation width of the upper surface of the glass 40 does not equal to that of the lower surface of the glass 40, the first rubber anti-slip block 31 and the second rubber anti-slip block 32 overlap in part.

The glass 40 may be fixed within the encapsulation mold 100 in the following way. First, the glass 40 is placed on the lower mold 20, so that a concave surface or a convex surface of the glass 40 (namely, the lower surface of the glass 40) is propped by the second surface 321 of the second rubber anti-slip block 32. After that, the glass 40 is positioned preliminarily. Then the upper mold 10 is pressed against the lower mold 20, so that the first surface 311 of the first rubber anti-slip block 31 engages a convex surface or a concave surface of the glass 40 (namely, the upper surface of the glass 40). Because the distance between the first surface 311 of the first rubber anti-slip block 31 and the second surface 321 of the second rubber anti-slip block 32 is less than the thickness of the glass 40, the first rubber anti-slip block 31 and the second rubber anti-slip block 32 deform. The first rubber anti-slip block 31 applies a first downward force to the glass 40, and the second rubber anti-slip block 32 applies a second upward force to the glass 40. Under the combined actions of the first downward force and the second upward force, the glass 40 is completely fixed within the encapsulation mold 100, which prevents the glass 40 from moving during injection molding, thereby reducing the breakage rate of the glass.

When the encapsulation mold is in the process of pressure maintaining, the glass 40 may be squeezed with the first rubber anti-slip block 31 and the second rubber anti-slip block 32. Because both the first rubber anti-slip block 31 and the second rubber anti-slip block 32 are elastic, they have a function of buffering, which may prevent the glass 40 from breakage.

Further, even when the glasses 40 from different batches have different curvature tolerances, the first rubber anti-slip block 31 and the second rubber anti-slip block 32 can still contact with the glass in large area, owing to deformation of the first rubber anti-slip block 31 and the second rubber anti-slip block 32. Thus, the forces applied to the glass 40 by the first rubber anti-slip block 31 and the second rubber anti-slip block 32 may distribute on the glass 40 relatively uniformly, which may prevent the glass 40 from breaking. In other words, the first rubber anti-slip block 31 and the second rubber anti-slip block 32 may compensate for the curvature tolerance of the glass 40.

In some embodiments, screws may be used to mount the first rubber anti-slip block 31 on the upper mold 10 and to mount the second rubber anti-slip block 32 on the lower mold 20. Specifically, referring to FIG. 6, a plurality of counter bores 36 are formed on the first surface 311 of the first rubber anti-slip block 31 and a plurality of counter bores 36 are formed on the second surface 321 of the second rubber anti-slip block 32. The screws extending through the counter bores 36 fix the first rubber anti-slip block 31 to the upper mold 10, and fix the second rubber anti-slip block 32 to the lower mold 20. In some embodiments, other components which can be easily disassembled may be used to fix the first rubber anti-slip block 31 to the upper mold 10, and fix the second rubber anti-slip block 32 to the lower mold 20. In this way, in the event that the first rubber anti-slip block 31 and the second rubber anti-slip block 32 are worn down after the clamping device has been used for a time period, they can be easily disassembled and be replaced with new ones, thereby extending the service life of the encapsulation mold 100.

Figure 3:
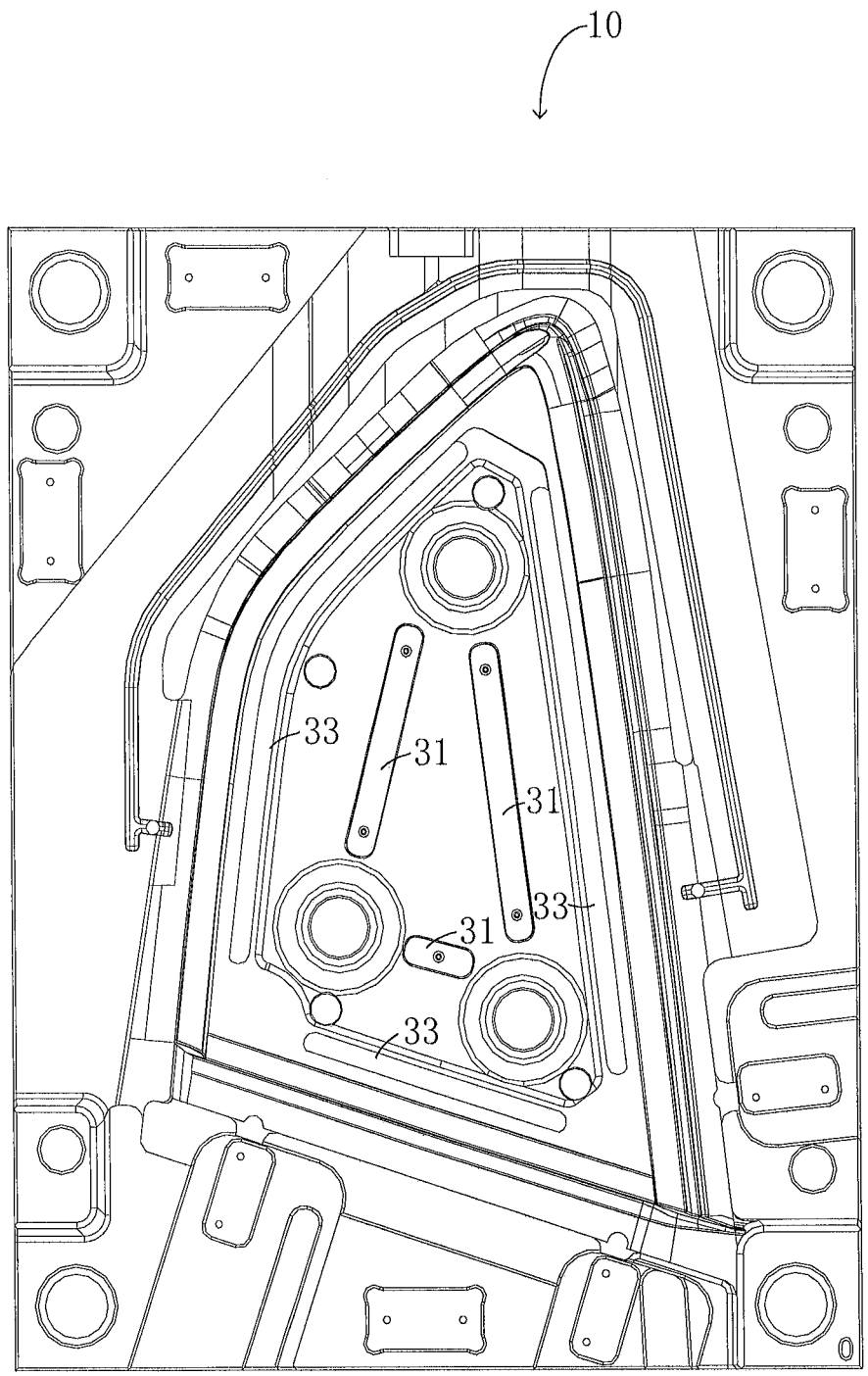
FIG. 3 schematically illustrates a layout view of a first rubber anti-slip block and a third rubber anti-slip block disposed on an upper mold, according to one embodiment of the present disclosure.
Figure 4:
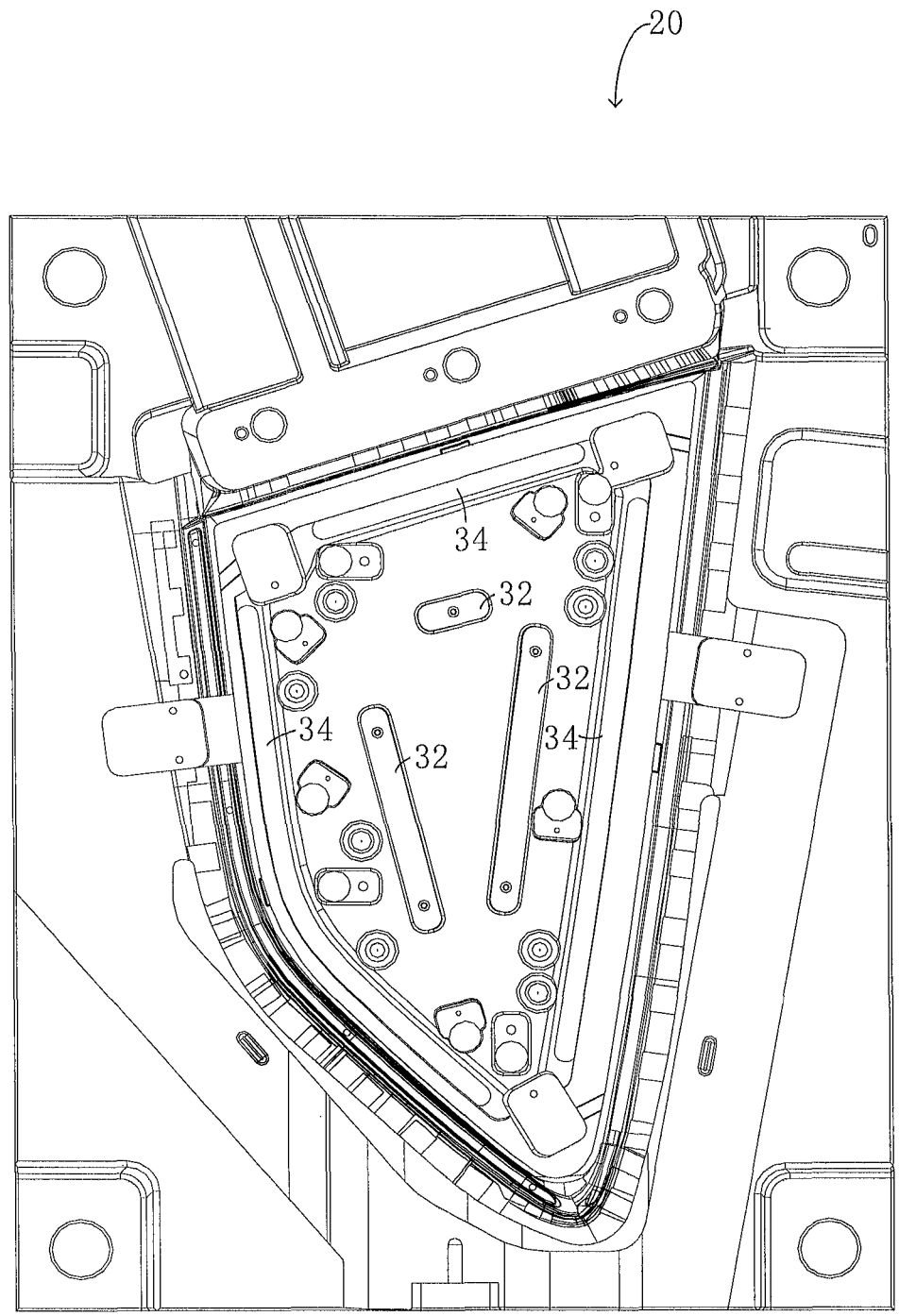
FIG. 4 schematically illustrates a layout view of a second rubber anti-slip block and a fourth rubber anti-slip block disposed on a lower mold, according to one embodiment of the present disclosure.
Figure 5:
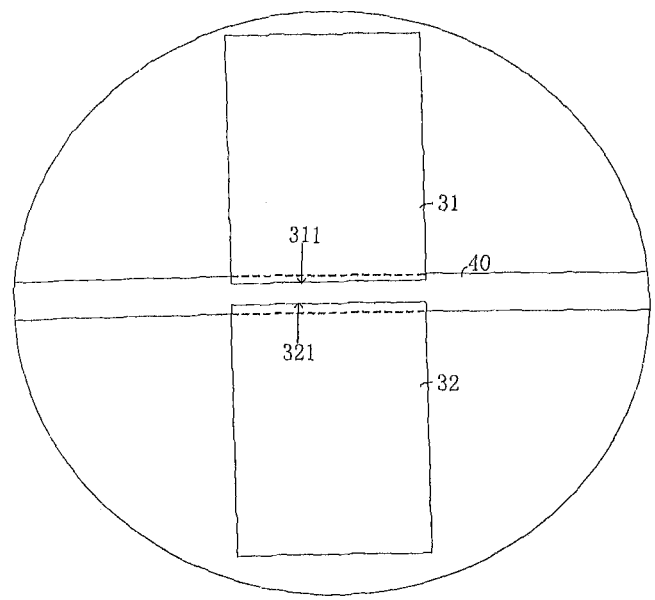
FIG. 5 schematically illustrates a partial enlarged view of a glass fixed between the first rubber anti-slip block and the second rubber anti-slip block, according to one embodiment of the present disclosure.
Figure 6:
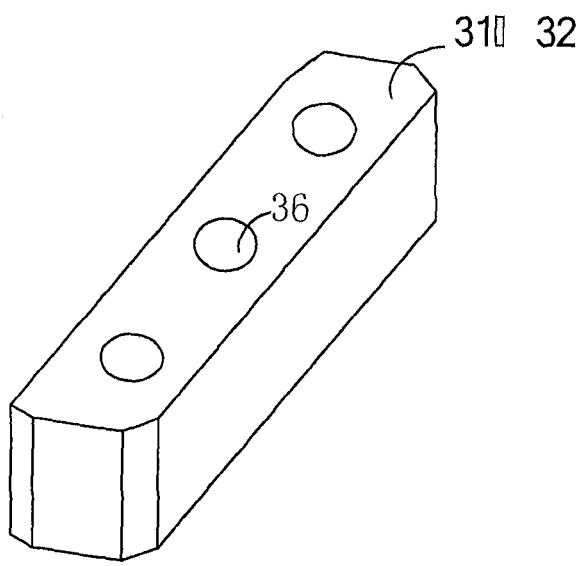
FIG. 6 schematically illustrates a structural diagram of the first rubber anti-slip block or the second rubber anti-slip block, according to one embodiment of the present disclosure.
Figure 7:
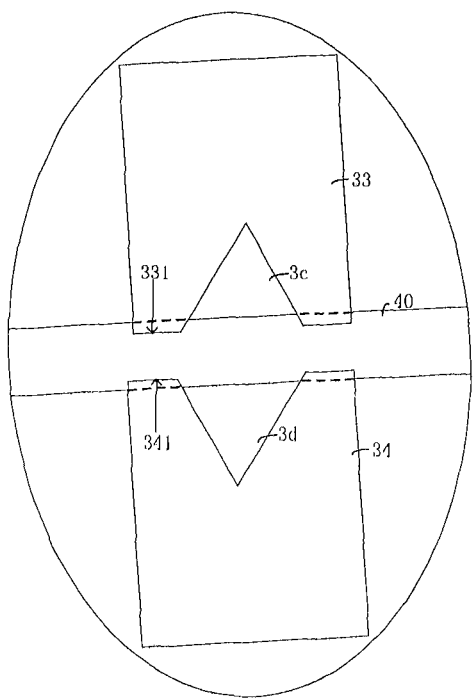
FIG. 7 schematically illustrates a partial enlarged view of a glass fixed between the third rubber anti-slip block and the fourth rubber anti-slip block, according to one embodiment of the present disclosure.
Figure 8:
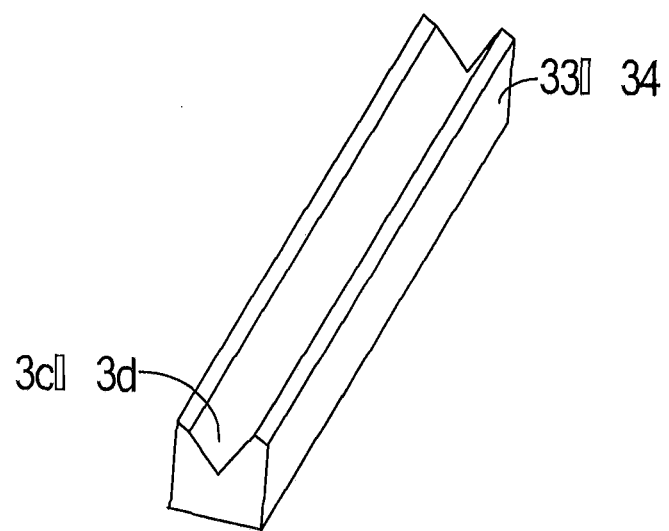
FIG. 8 schematically illustrates a structural diagram of the third rubber anti-slip block or the fourth rubber anti-slip block, according to one embodiment of the present disclosure.
Figure 9:
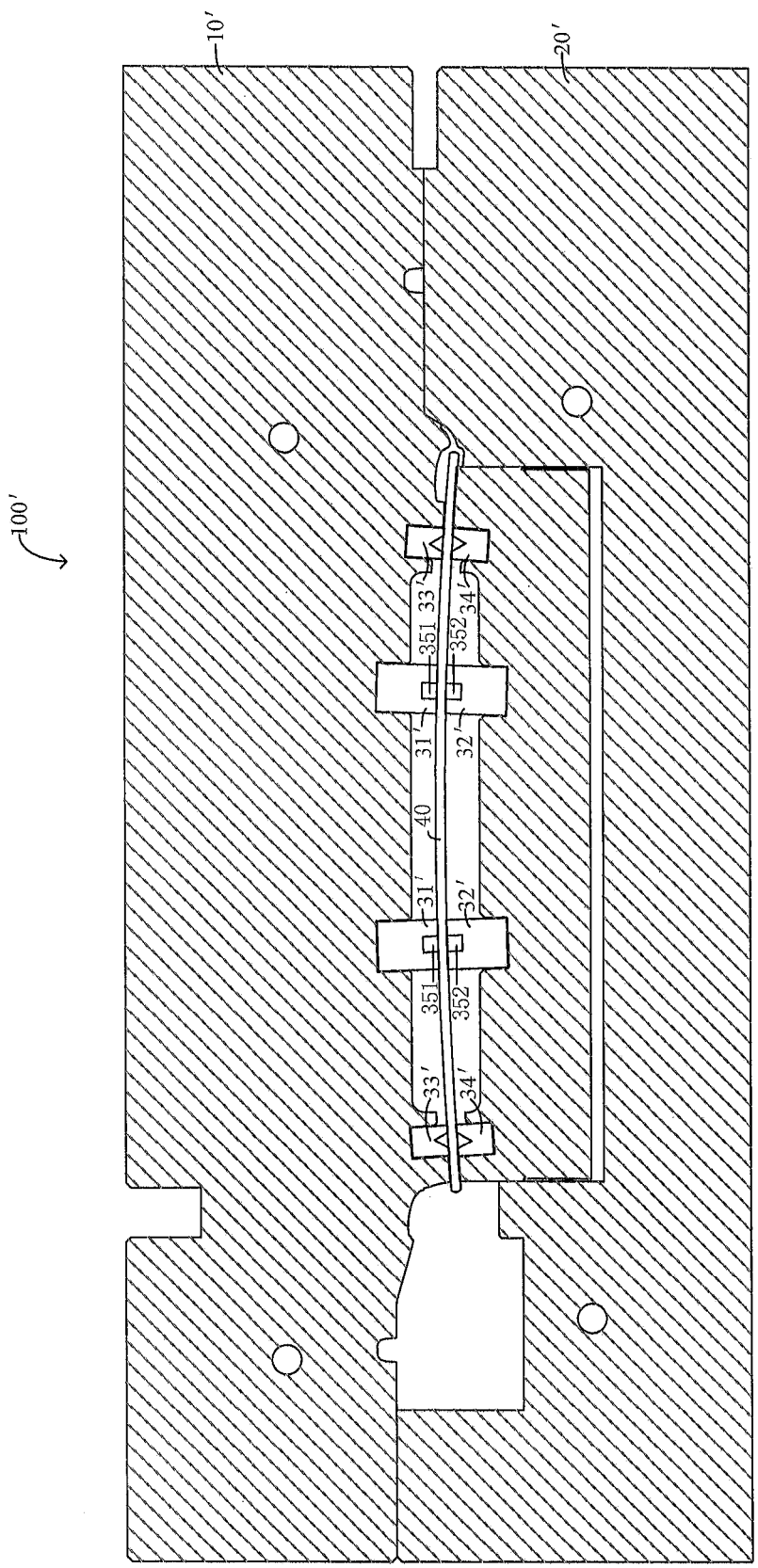
FIG. 9 schematically illustrates a cross-sectional view of an encapsulation mold, according to another embodiment of the present disclosure.

The encapsulation mold 100 has at least one first rubber anti-slip block 31 and at least one second rubber anti-slip block 32. In order to completely fix the glass 40 within the encapsulation mold 100, there may be as many the first rubber anti-slip blocks 31 and the second rubber anti-slip blocks 32 as possible in the encapsulation mold 100. The number of the first rubber anti-slip blocks 31 and the second rubber anti-slip blocks 32 may be set according to the size of the glass 40. In some embodiments, the encapsulation mold 100 has at least three first rubber anti-slip blocks 31 and at least three second rubber anti-slip blocks 32 (as an example, there are three first rubber anti-slip blocks and three second rubber anti-slip blocks schematically shown in FIG. 3 and FIG. 4, respectively The at least three first rubber anti-slip blocks 31 are fixed to the upper mold 10 at different positions and arranged in a polygon pattern, and the at least three second rubber anti-slip blocks 32 are fixed to the lower mold 20 at different positions and arranged in a polygon pattern. Referring to FIG. 3, the three first rubber anti-slip blocks 31 are arranged in a triangle pattern. Referring to FIG. 4, the three second rubber anti-slip blocks 32 are arranged in a triangle pattern.

The widths of the first rubber anti-slip blocks 31 and the second rubber anti-slip blocks 32 may be set according to the size of the glass 40. In order to completely fix the glass 40 within the encapsulation mold 100, the widths of the first rubber anti-slip blocks 31 and the second rubber anti-slip blocks 32 may be set as great as possible. It should be noted that the widths of the first rubber anti-slip blocks 31 and the second rubber anti-slip blocks 32 may not be too great, to avoid breakage of the glass 40 due to a large force.

The first rubber anti-slip blocks 31 and the second rubber anti-slip blocks 32 may be made of various rubber materials. Taking into account the characteristics of injection molding in which the first rubber anti-slip blocks 31 and the second rubber anti-slip blocks 32 are applied, the first rubber anti-slip blocks 31 and the second rubber anti-slip blocks 32 may be made of Ethylene-Propylene-Diene Monomer (EPDM).

In order to increase the matching between the first rubber anti-slip block 31/the second rubber anti-slip block 32 with the glass 40, the first surface 311 of the first rubber anti-slip block 31 may be set to be concave and the second surface 321 of the second rubber anti-slip block 32 may be set to be convex. Or alternatively, the first surface 311 of the first rubber anti-slip block 31 may be set to be convex and the second surface 321 of the second rubber anti-slip block 32 may be set to be concave. The concave surface of the rubber anti-slip blocks matches the convex surface of the glass 40, and the convex surface of the rubber anti-slip blocks matches the concave surface of the glass 40.

In order to compensate for the curvature tolerance of the glass effectively, the distance between the first surface 311 of the first rubber anti-slip block 31 and the second surface 321 of the second rubber anti-slip block 32 needs to be suitable. In some embodiments, the distance between the first surface 311 of the first rubber anti-slip block 31 and the second surface 321 of the second rubber anti-slip block 32 is about 0.15 mm to about 0.25 mm less than the thickness of the glass 40.

For stably fixing a glass 40 of relatively large size, referring to FIG. 2 to FIG. 4 and FIG. 7 to FIG. 8, the clamping device may further include a third rubber anti-slip block 33 which is fixed to a joint surface of the upper mold 10 and has a third surface 331 for clamping the glass 40, and a fourth rubber anti-slip block 34 which is fixed to a joint surface of the lower mold 20 and has a fourth surface 341 for clamping the glass 40. In some embodiments, the clamping device may have equal numbers of the third rubber anti-slip blocks 33 and the fourth rubber anti-slip blocks 34. In some embodiments, when the upper mold 10 is pressed against the lower mold 20, the third rubber anti-slip block 33 and the fourth rubber anti-slip block 34 may overlap at least in part. And a distance between the third surface 331 of the third rubber anti-slip block 33 and the fourth surface 341 of the fourth rubber anti-slip block 34 is less than a thickness of the glass 40. In some embodiments, the distance between the third surface 331 of the third rubber anti-slip block 33 and the fourth surface 341 of the fourth rubber anti-slip block 34 is about 0.15 mm to about 0.25 mm less than the thickness of the glass 40. If an encapsulation width of an upper surface of the glass 40 equals to that of a lower surface of the glass 40, the third rubber anti-slip block 33 and the fourth rubber anti-slip block 34 overlap completely. If an encapsulation width of an upper surface of the glass 40 does not equal to that of a lower surface of the glass 40, the third rubber anti-slip block 33 and the fourth rubber anti-slip block 34 overlap in part.

In order to avoid breakage of the glass 40 due to a large contact area between the third rubber anti-slip block 33/the fourth rubber anti-slip block 34 and the glass 40, a third groove 3c is formed in a third rubber anti-slip block 33 on the third surface 331, and a fourth groove 3d is formed in a fourth rubber anti-slip block 34 on the fourth surface 341. In some embodiments, the third groove 3c and the fourth groove 3d may respectively have a substantially V-shaped, square or W-shaped cross section (the cross section is perpendicular to the third surface 331 and the fourth surface 341), or other shapes. In some embodiments, the widths of the third rubber anti-slip block 33 and the fourth rubber anti-slip block 34 are respectively less than those of the first rubber anti-slip block 31 and the second rubber anti-slip block 32, so that the contact area between the third rubber anti-slip block 33/the fourth rubber anti-slip block 34 and the glass 40 can be reduced, thereby preventing the glass 40 from breaking.

In some embodiments, a processing groove (not shown) may be formed in the upper mold 10, and a processing groove (not shown) may be formed in the lower mold 20. Widths of the processing grooves are less than those of the third rubber anti-slip block 33 and the fourth rubber anti-slip block 34. Thus, while placing the third rubber anti-slip block 33 in the processing groove of the upper mold 10, and placing the fourth rubber anti-slip block 34 in the processing groove of the lower mold 20, the third rubber anti-slip block 33 and the fourth rubber anti-slip block 34 deform because of squeezing.

As a result, the third rubber anti-slip block 33 embedded in the processing groove is fixed to the upper mold 10 tightly, and the fourth rubber anti-slip block 34 embedded in the processing groove is fixed to the lower mold 20 tightly. In some embodiments, the third rubber anti-slip block 33 and the fourth rubber anti-slip block 34 may be fixed to the upper mold 10 and the lower mold 20 in other ways of easy disassembling. In this way, in the event that the third rubber anti-slip block 33 and the fourth rubber anti-slip block 34 are worn down after the clamping device has been used for a time period, they can be easily disassembled and be replaced with new ones, thereby extending the service life of the encapsulation mold 100.

The encapsulation mold 100 has at least one third rubber anti-slip blocks 33 and at least one fourth rubber anti-slip blocks 34. In order to completely fix the glass 40 within the encapsulation mold 100, there may be as many the third rubber anti-slip blocks 33 and the fourth rubber anti-slip blocks 34 as possible in the encapsulation mold 100. In some embodiments, the encapsulation mold 100 has at least three third rubber anti-slip blocks 33 and at least three fourth rubber anti-slip blocks 34 (as an example, there are three third anti-slip blocks and three fourth rubber anti-slip blocks schematically shown in FIG. 3 and FIG. 4, respectively). The at least three third rubber anti-slip blocks 33 are fixed to the upper mold 10 at different positions and arranged in a polygon pattern, and the at least three fourth rubber anti-slip blocks 34 are fixed to the lower mold 20 at different positions and arranged in a polygon pattern. Referring to FIG. 3, the three third rubber anti-slip blocks 33 are arranged in a quadrilateral pattern. Referring to FIG. 4, the three fourth rubber anti-slip blocks 34 are arranged in a quadrilateral pattern.

Similar to the first rubber anti-slip block 31 and the second rubber anti-slip block 32, the third rubber anti-slip block 33 and the fourth rubber anti-slip block 34 may be made of various rubber materials. Taking into account the characteristics of injection molding in which the third rubber anti-slip block 33 and the fourth rubber anti-slip block 34 are applied, the third rubber anti-slip block 33 and the fourth rubber anti-slip block 34 may be made of Ethylene-Propylene-Diene Monomer (EPDM).

Referring to FIG. 3 and FIG. 4, when the clamping device is provided with all of the first rubber anti-slip blocks 31, the second rubber anti-slip blocks 32, the third rubber anti-slip blocks 33 and the fourth rubber anti-slip blocks 34, the third rubber anti-slip blocks 33 are located closer to an edge of the upper mold 10 compared with the first rubber anti-slip blocks 31, and the fourth rubber anti-slip blocks 34 are located closer to an edge of the lower mold 20 compared with the second rubber anti-slip blocks 32. In this way, the first rubber anti-slip blocks 31 and the second rubber anti-slip blocks 32 may fix a central region of the glass 40, and the third rubber anti-slip blocks 33 and the fourth rubber anti-slip blocks 34 may fix a peripheral region of the glass 40.

If a clamping device is provided with all of the first rubber anti-slip block 31, the second rubber anti-slip block 32, the third rubber anti-slip block 33 and the fourth rubber anti-slip block 34, the glass 40 may be fixed within the encapsulation mold 100 having this clamping device in the following way. First, the glass 40 is placed on the lower mold 20, so that a concave surface or a convex surface of the glass 40 (namely, the lower surface of the glass 40) is propped by the second surface 321 of the second rubber anti-slip block 32 and the fourth surface 341 of the fourth rubber anti-slip block 34. After that, the glass 40 is positioned preliminarily. Then the upper mold 10 is pressed against the lower mold 20, so that the first surface 311 of the first rubber anti-slip block 31 and the third surface 331 of the third rubber anti-slip block 33 engages a convex surface or a concave surface of the glass 40 (namely, the upper surface of the glass 40). Because the distance between the first surface 311 of the first rubber anti-slip block 31 and the second surface 321 of the second rubber anti-slip block 32 is less than the thickness of the glass 40, and the distance between the third surface 331 of the third rubber anti-slip block 33 and the fourth surface 341 of the fourth rubber anti-slip block 34 is less than the thickness of the glass 40, the first rubber anti-slip block 31 deforms and applies a first downward force to the glass 40, the second rubber anti-slip block 32 deforms and applies a second upward force to the glass 40, the third rubber anti-slip block 33 deforms and applies a third downward force to the glass 40, and the fourth rubber anti-slip block 34 deforms and applies a fourth upward force to the glass 40. Under the combined actions of the first downward force, the second upward force, the third downward force and the fourth upward force, the glass 40 can be completely fixed within the encapsulation mold 100, which prevents the glass 40 from moving during injection molding, thereby reducing the breakage rate of the glass.

It is known that, when a glass has a big size, it is difficult to control the curvature tolerance of the glass during fabrication. As described above, in order to completely fix the glass 40 within the encapsulation mold 100, the first rubber anti-slip block 31 and the second rubber anti-slip block 32 may be set to have a relatively large size. In other words, the contact area between the first rubber anti-slip block 31/the second rubber anti-slip block 32 and the glass 40 is large. However, if there are large variations in the curvature tolerance of the glass 40, the glass 40 is easy to be crushed.

Referring to FIG. 9 to FIG. 13, an encapsulation mold 100' according to another embodiment of the present disclosure is provided, which may include an upper mold 10', a lower mold 20' and a clamping device. The clamping device may include a first rubber anti-slip block 31' which is fixed to a joint surface of the upper mold 10' and has a first surface 311', and a second rubber anti-slip block 32' which is fixed to a joint surface of the lower mold 20' and has a second surface 321'. In some embodiment, a rubber bump 351 is provided on the first surface 311' of the first rubber anti-slip block 31', which extends higher than the first surface 311', and a rubber bump 352 is provided on the second surface 321' of the second rubber anti-slip block 32', which extends higher than the second surface 321'. In some embodiments, the clamping device may have equal numbers of the first rubber anti-slip blocks 31' and the second rubber anti-slip blocks 32', In some embodiments, the rubber bump 351 may be integrated with the first rubber anti-slip block 31', and the rubber bump 352 may be integrated with the second rubber anti-slip block 32'. In some embodiments, is the first rubber anti-slip block 31' has a first groove 3a formed on the first surface 311' which has a width less than that of the first rubber anti-slip block 31'. The rubber bump 351 is embedded in the first groove 3a, which extends higher than the first surface 311'. The second rubber anti-slip block 32' has a second groove 3b formed on the second surface 321', which has a width less than that of the second rubber anti-slip block 32'. The rubber bump 352 is embedded in the second groove 3b, which extends higher than the second surface 321'.

In some embodiments, a processing groove (not shown) may be formed in the first rubber anti-slip block 31', and a processing groove (not shown) may be formed in the second rubber anti-slip block 32'. Widths of the processing grooves are less than those of the rubber bump 351 and the rubber bump 352. Thus, while placing the rubber bump 351 in the processing groove of the first rubber anti-slip block 31', and placing the rubber bump 352 in the processing groove of the second rubber anti-slip block 32', the rubber bumps 351 and 352 deform because of squeezing. As a result, the rubber bump 351 embedded in the processing groove is fixed to the first rubber anti-slip block 31' tightly, and the rubber bump 352 embedded in the processing groove is fixed to the second rubber anti-slip block 32' tightly.

When the upper mold 10' is pressed against the lower mold 20', the first rubber anti-slip block 31' and the second rubber anti-slip block 32' overlap completely, and the rubber bump 351 and the rubber bump 352 overlap at least in part. A distance between the rubber bump 351 of the first rubber anti-slip block 31' and the rubber bump 352 of the second rubber anti-slip block 32' is less than the thickness of the glass 40. And a distance between the first surface 311' of the first rubber anti-slip block 31' and the second surface 321' of the second rubber anti-slip block 32' equals to the thickness of the glass 40. While most portion of the glass 40 is clamped between the rubber bump 351 of the first rubber anti-slip block 31' and the rubber bump 352 of the second rubber anti-slip block 32', some portion of the glass may probably also be clamped between the first rubber anti-slip block 31' and the second rubber anti-slip block 32' because the glass 40 may have curvature tolerance. However, the forces applied to the glass 40 by the first rubber anti-slip block 31' and the second rubber anti-slip block 32' are less than those applied by the first rubber anti-slip block 31 and the second rubber anti-slip block 32 as described in the above embodiments.

If an encapsulation width of an upper surface of the glass 40 equals to that of a lower surface of the glass 40, the rubber bump 351 and the rubber bump 352 overlap completely. If an encapsulation width of an upper surface of the glass 40 does not equal to that of a lower surface of the glass 40, the rubber bump 351 and the rubber bump 352 overlap in part.

The glass 40 may be fixed within the encapsulation mold 100' in the following way. First, the glass 40 is placed on the lower mold 20', so that a concave surface or a convex surface of the glass 40 (namely, the lower surface of the glass 40) is propped by the rubber bump 352 of the second rubber anti-slip block 32'. After that, the glass 40 is positioned preliminarily. Then the upper mold 10' is pressed against the lower mold 20', so that the rubber bump 351 of the first rubber anti-slip block 31' engages a convex surface or a concave surface of the glass 40 (namely, the upper surface of the glass 40). Because the distance between the rubber bump 351 of the first rubber anti-slip block 31' and the rubber bump 352 of the second rubber anti-slip block 32' is less than the thickness of the glass 40, the rubber bump 351 of the first rubber anti-slip block 31' and the rubber bump 352 of the second rubber anti-slip block 32' deform. In the meantime, the first rubber anti-slip block 31' deforms under the action of the rubber bump 351, and the second rubber anti-slip block 32' deforms under the action of the rubber bump 352. The rubber bump 351 applies a first downward force to the glass 40, and the rubber bump 352 applies a second upward force to the glass 40. Under the combined actions of the first downward force and the second upward force, the glass 40 is completely fixed within the encapsulation mold 100', which prevents the glass 40 from moving during injection molding, thereby reducing the breakage rate of the glass.

Widths of the rubber bump 351 of the first rubber anti-slip block 31' and the rubber bump 352 of the second rubber anti-slip block 32' are respectively less than those of the first rubber anti-slip block 31' and the second rubber anti-slip block 32'. Therefore, the rubber bump 351 and the rubber bump 352 have a small contact area with the glass 40. Thus, the forces applied to the glass 40 by the rubber bump 351 and the rubber bump 352 are relatively low. Further, because the first rubber anti-slip block 31' may deform under the action of the rubber bump 351, and the second rubber anti-slip block 32' may deform under the action of the rubber bump 352, it is equivalent to enhancing deformability of the rubber bump 351 and the rubber bump 352. Therefore, the breakage rate can be reduced even if the glass 40 has a great size and curvature tolerance.

Considering that the forces applied to the glass 40 by the rubber bump 351 of the first rubber anti-slip block 31' and the rubber bump 352 of the second rubber anti-slip block 32' may be insufficient, which may result in that the glass 40 may not be completely fixed in the encapsulation mold 100', the rubber bump 351 of the first rubber anti-slip block 31' may extend higher than the first surface 311' of the first rubber anti-slip block 31' as much as possible, and the rubber bump 352 of the second rubber anti-slip block 32' may extend higher than the second surface 321' of the second rubber anti-slip block 32' as much as possible, so as to decrease the distance between the rubber bump 351 of the first rubber anti-slip block 31' and the rubber bump 352 of the second rubber anti-slip block 32'. In some embodiments, the rubber bump 351 of the first rubber anti-slip block 31' is about 0.45 mm to about 0.55 mm higher than the first surface 311', and the rubber bump 352 of the second rubber anti-slip block 32' is about 0.45 mm to about 0.55 mm higher than the second surface 321'.

The first rubber anti-slip block 31' and the second rubber anti-slip block 32' may be made of various rubber materials. Taking into account the characteristics of injection molding in which the first rubber anti-slip block 31' and the second rubber anti-slip block 32' are applied, the first rubber anti-slip block 31' and the second rubber anti-slip block 32' may be made of Ethylene-Propylene-Diene Monomer (EPDM). Similar to the first rubber anti-slip block 31' and the second rubber anti-slip block 32', the rubber bump 351 and the rubber bump 352 may be made of various rubber materials. Taking into account the characteristics of injection molding in which the rubber bump 351 and the rubber bump 352 are applied, the rubber bump 351 and the rubber bump 352 may be made of Ethylene-Propylene-Diene Monomer (EPDM).

In some embodiments, referring to FIG. 9 to FIG. 12 and FIG. 14 to FIG. 15, the clamping device may further include a third rubber anti-slip block 33' and a fourth rubber anti-slip block 34', in addition to the first rubber anti-slip block 31' and the second rubber anti-slip block 32'. The third rubber anti-slip block 33' is fixed to a joint surface of the upper mold 10' and has a third surface 331' for clamping the glass 40. The fourth rubber anti-slip block 34' is fixed to a joint surface of the lower mold 20' and has a fourth surface 341' for clamping the glass 40. In some embodiments, the clamping device has equal numbers of the third rubber anti-slip blocks 33' and the fourth rubber anti-slip blocks 34'. In some embodiments, when the upper mold 10' is pressed against the lower mold 20', the third rubber anti-slip block 33' and the fourth rubber anti-slip block 34' may overlap at least in part. And a distance between the third surface 331' of the third rubber anti-slip block 33' and the fourth surface 341' of the fourth rubber anti-slip block 34' is less than the thickness of the glass 40. In some embodiments, the distance between the third surface 331' of the third rubber anti-slip block 33' and the fourth surface 341' of the fourth rubber anti-slip block 34' is about 0.15 mm to about 0.25 mm less than the thickness of the glass 40.

If an encapsulation width of an upper surface of the glass 40 equals to that of a lower surface of the glass 40, the third rubber anti-slip block 33' and the fourth rubber anti-slip block 34' overlap completely. If an encapsulation width of an upper surface of the glass 40 does not equal to that of a lower surface of the glass 40, the third rubber anti-slip block 33' and the fourth rubber anti-slip block 34' overlap in part.

In order to avoid breakage of the glass 40 due to a large contact area between the third rubber anti-slip block 33'/the fourth rubber anti-slip block 34' and the glass 40, the third rubber anti-slip block 33' may be provided with a third groove 3c' on the third surface 331'; and the fourth rubber anti-slip block 34' may be provided with a fourth groove 3d' on the fourth surface 341'. More details may refer to the preceding embodiments, and will not be described in detail herein.

Figure 10:
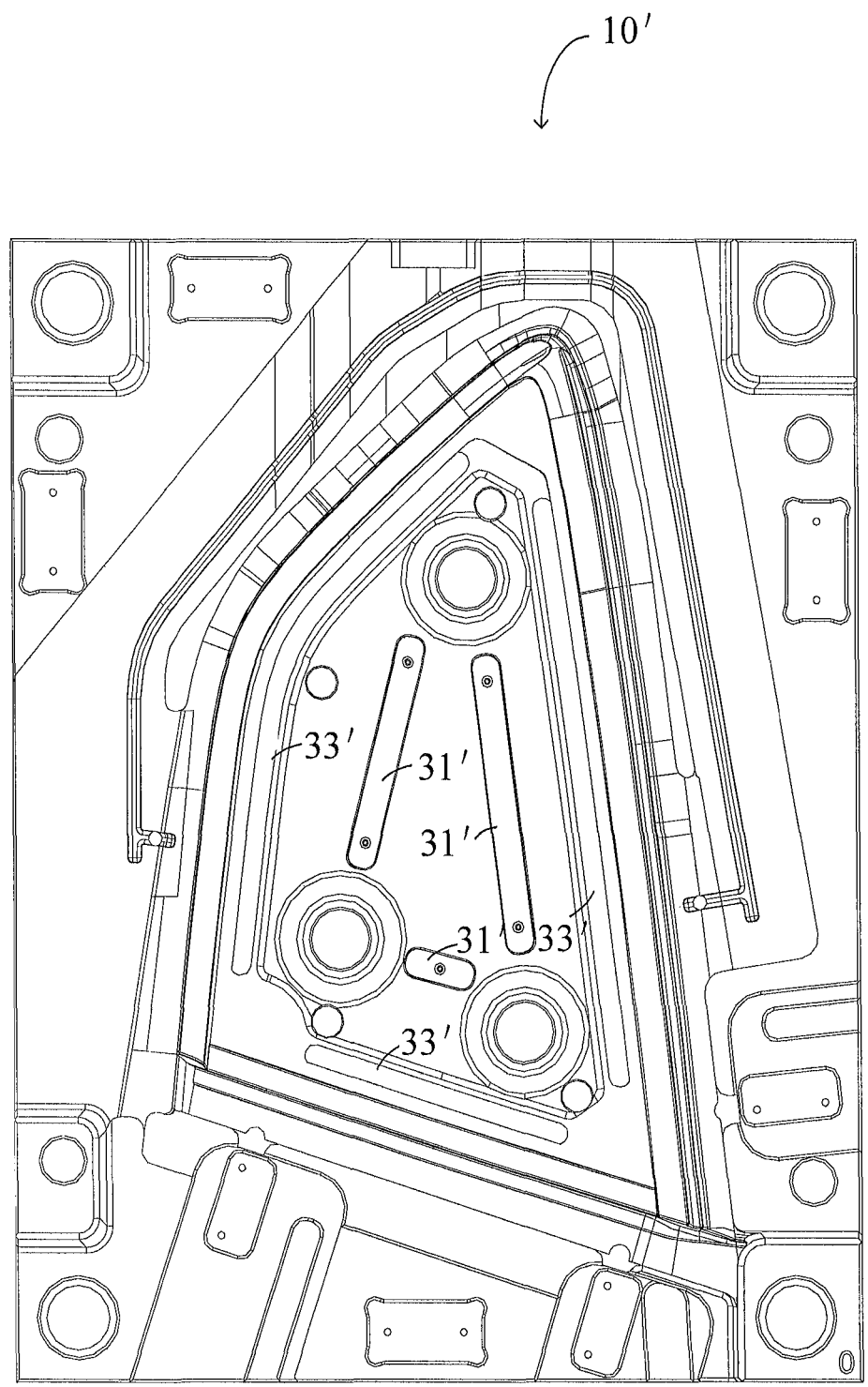
FIG. 10 schematically illustrates a layout view of a first rubber anti-slip block and a third rubber anti-slip block disposed on an upper mold, according to another embodiment of the present disclosure.
Figure 11:
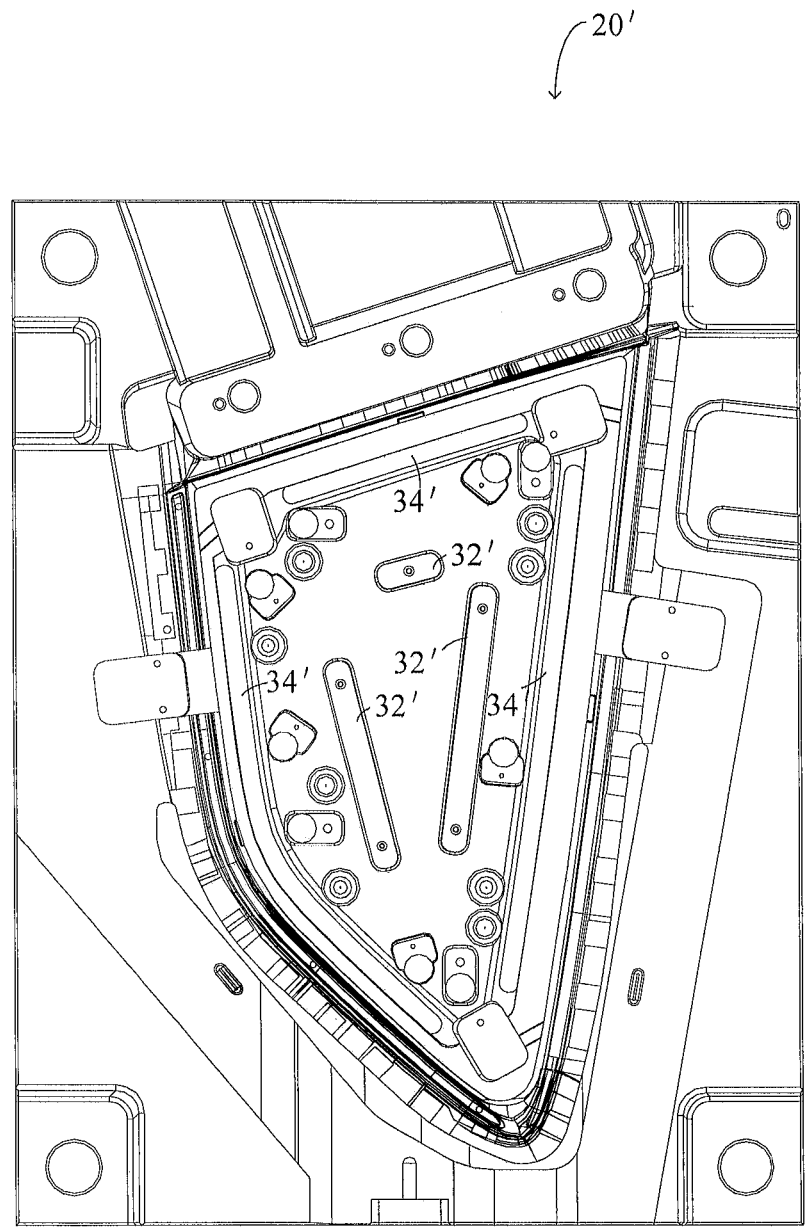
FIG. 11 schematically illustrates a layout view of a second rubber anti-slip block and a fourth rubber anti-slip block disposed on a lower mold, according to another embodiment of the present disclosure.
Figure 12:
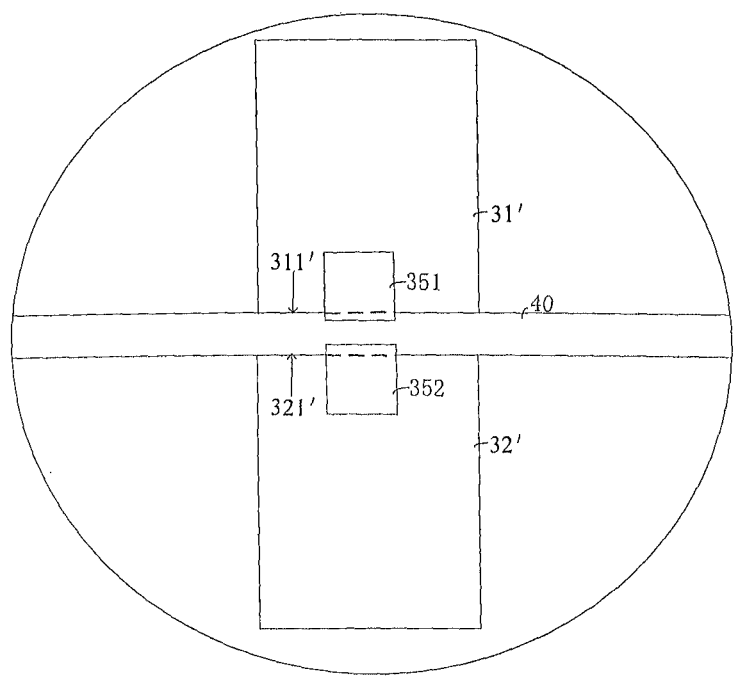
FIG. 12 schematically illustrates a partial enlarged view of a glass fixed between a rubber bump of the first rubber anti-slip block and a rubber bump of the second rubber anti-slip block, according to one embodiment of the present disclosure.
Figure 13:
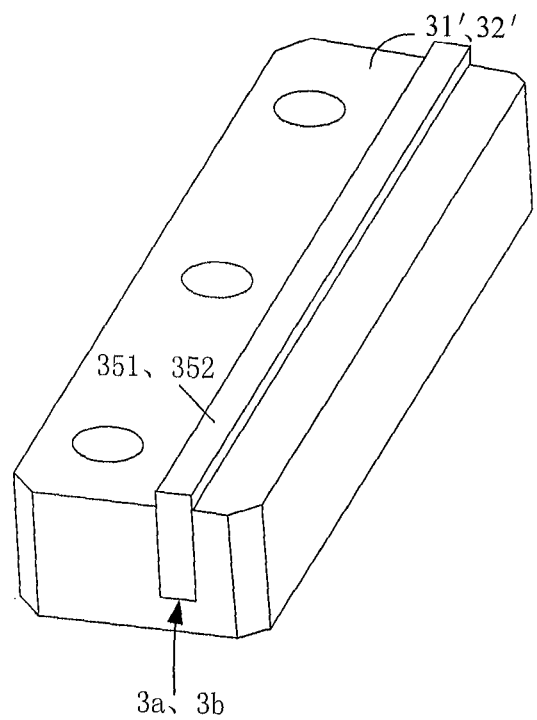
FIG. 13 schematically illustrates a structural diagram of the first rubber anti-slip block or the second rubber anti-slip block having a rubber bump embedded therein, according to one embodiment of the present disclosure.
Figure 14:
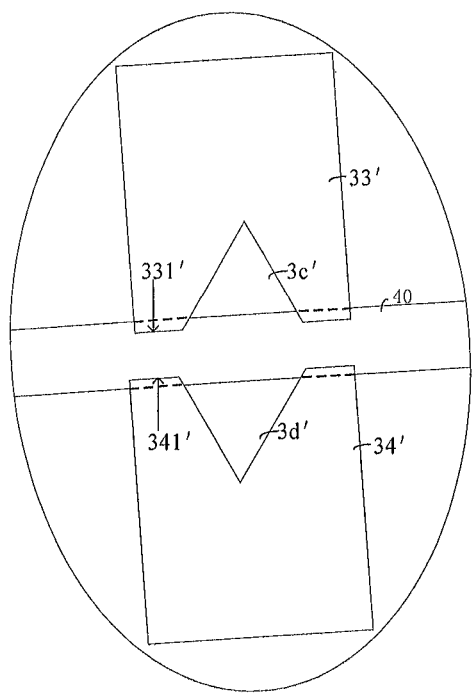
FIG. 14 schematically illustrates a partial enlarged view of a glass fixed between the third rubber anti-slip block and the fourth rubber anti-slip block, according to another embodiment of the present disclosure.
Figure 15:
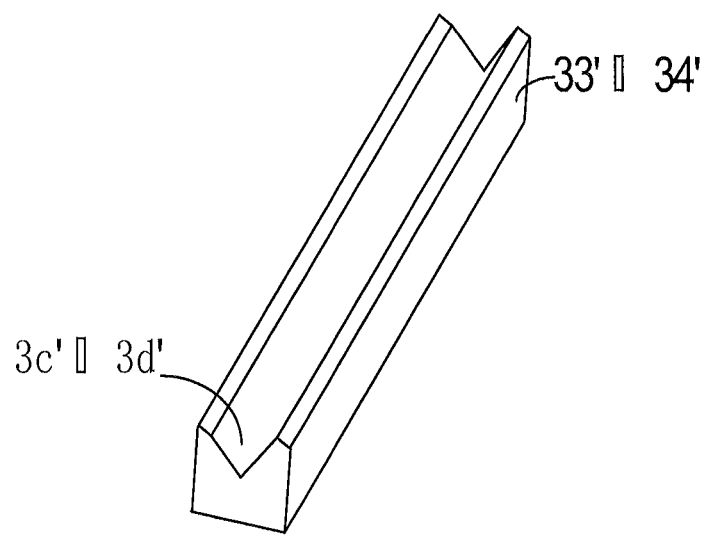
FIG. 15 schematically illustrates a structural diagram of the third rubber anti-slip block or the fourth rubber anti-slip block, according to another embodiment of the present disclosure.

The encapsulation mold 100' has at least one third rubber anti-slip blocks 33' and at least one fourth rubber anti-slip blocks 34'. In order to completely fix the glass 40 within the encapsulation mold 100', there may be as many the third rubber anti-slip blocks 33' and the fourth rubber anti-slip blocks 34' as possible in the encapsulation mold 100'. In some embodiments, the encapsulation mold 100' has at least three third rubber anti-slip block 33' and at least three fourth rubber anti-slip blocks 34' (as an example, there are three third anti-slip blocks and three fourth rubber anti-slip blocks schematically shown in FIG. 10 and FIG. 11, respectively). The at least three third rubber anti-slip blocks 33' are fixed to the upper mold 10' at different positions and arranged in a polygon pattern, and the at least three fourth rubber anti-slip blocks 34' are fixed to the lower mold 20' at different positions and arranged in a polygon pattern. Referring to FIG. 10, the three third rubber anti-slip blocks 33' are arranged in a quadrilateral pattern. Referring to FIG. 11, the three fourth rubber anti-slip blocks 34' are arranged in a quadrilateral pattern.

If a clamping device is provided with the first rubber anti-slip block 31', the second rubber anti-slip block 32', the third rubber anti-slip block 33' and the fourth rubber anti-slip block 34', the glass 40 may be fixed within the encapsulation mold 100' having this clamping device in the following way. First, the glass 40 is placed on the lower mold 20', so that a concave surface or a convex surface of the glass 40 (namely, the lower surface of the glass 40) is propped by the second rubber bump 352 of the second rubber anti-slip block 32' and the fourth surface 341' of the fourth rubber anti-slip block 34'. After that, the glass 40 is positioned preliminarily. Then the upper mold 10' is pressed against the lower mold 20', so that the rubber bump 351 of the first rubber anti-slip block 31' and the third surface 331' of the third rubber anti-slip block 33' engage a convex surface or a concave surface of the glass 40 (namely, the upper surface of the glass 40). Because the distance between the rubber bump 351 of the first rubber anti-slip block 31' and the rubber bump 352 of the second rubber anti-slip block 32' is less than the thickness of the glass 40, and the distance between the third surface 331' of the third rubber anti-slip block 33' and the fourth surface 341' of the fourth rubber anti-slip block 34' is less than the thickness of the glass 40, the rubber bump 351 of the first rubber anti-slip block 31' deforms and applies a first downward force to the glass 40, the rubber bump 352 of the second rubber anti-slip block 32' deforms and applies a second upward force to the glass 40, the third rubber anti-slip block 33' deforms and applies a third downward force to the glass 40, and the fourth rubber anti-slip block 34' deforms and applies a fourth upward force to the glass 40. Under the combined actions of the first downward force, the second upward force, the third downward force and the fourth upward force, the glass 40 can be completely fixed within the encapsulation mold 100', which prevents the glass 40 from moving during injection molding, thereby reducing the breakage rate of the glass. If a glass 40 having a great curvature tolerance is encapsulated, the glass 40 may also be clamped between the first surface 311' of the first rubber anti-slip block 31' and the second surface 321' of the second rubber anti-slip block 32'. In this case, the first rubber anti-slip block 31' and the second rubber anti-slip block 32' also apply forces to the glass 40.

In conclusion, when the glass has a big size, the clamping device includes a first rubber anti-slip block and a third rubber anti-slip block fixed to a joint surface of the upper mold, and a second rubber anti-slip block and a fourth rubber anti-slip block fixed to a joint surface of the lower mold, wherein grooves are formed in the third rubber anti-slip block and the fourth rubber anti-slip block, the third rubber anti-slip block is closer to an edge of the upper mold than the first rubber anti-slip block, and the fourth rubber anti-slip block is closer to an edge of the lower mold than the second rubber anti-slip block. In this way, the first rubber anti-slip block and the second rubber anti-slip block may fix a central region of the glass, while the third rubber anti-slip block and the fourth rubber anti-slip block may fix a peripheral region of the glass.

In the event that the glass has a big size, rubber bumps may be provided on the first rubber anti-slip block and the second rubber anti-slip block, where the rubber bumps extend higher than the surfaces of the first rubber anti-slip block and the second rubber anti-slip block, respectively. In this way, the glass can be clamped between the rubber bump of the first rubber anti-slip block and the rubber bump of the second rubber anti-slip block. Because the contact area of the rubber bumps with the glass is small, the forces applied by the rubber bumps to the glass are relatively low, which reduces the breakage rate of the glass. As a result, the glass is not easy to be crushed even if the glass of a big size has a great curvature tolerance.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. An encapsulation mold, comprising:
    an upper mold;
    a lower mold; and
    a clamping device which comprises a first rubber anti-slip block fixed to a joint surface of the upper mold, and a second rubber anti-slip block fixed to a joint surface of the lower mold, wherein the first rubber anti-slip block has a first surface and the second rubber anti-slip block has a second surface, and when the upper mold is pressed against the lower mold, the first rubber anti-slip block and the second rubber anti-slip block overlap at least in part, and a minimum distance between the first rubber anti-slip block and the second rubber anti-slip block is less than a thickness of a glass to be encapsulated,
    wherein the first surface of the first rubber anti-slip block is concave, and the second surface of the second rubber anti-slip block is convex; or, the first surface of the first rubber anti-slip block is convex, and the second surface of the second rubber anti-slip block is concave, and
    wherein a concave one of the first and second surfaces is configured to match a convex surface of the glass to be encapsulated, and a convex one of the first and second surfaces is configured to match a concave surface of the glass to be encapsulated.

2. The encapsulation mold according to claim 1, wherein the encapsulation mold has equal numbers of the first rubber anti-slip blocks and the second rubber anti-slip blocks.

3. The encapsulation mold according to claim 1, wherein the minimum distance between the first rubber anti-slip block and the second rubber anti-slip block equals to a distance between the first surface of the first rubber anti-slip block and the second surface of the second rubber anti-slip block, and when the upper mold is pressed against the lower mold, the distance between the first surface of the first rubber anti-slip block and the second surface of the second rubber anti-slip block is about 0.15 mm to about 0.25 mm less than the thickness of the glass to be encapsulated.

4. An encapsulation mold, comprising:
an upper mold;
a lower mold; and
a clamping device which comprises a first rubber anti-slip block fixed to a joint surface of the upper mold, and a second rubber anti-slip block fixed to a joint surface of the lower mold,
wherein the first rubber anti-slip block has a first surface and the second rubber anti-slip block has a second surface, and when the upper mold is pressed against the lower mold, the first rubber anti-slip block and the second rubber anti-slip block overlap at least in part, and a minimum distance between the first rubber anti-slip block and the second rubber anti-slip block is less than a thickness of a glass to be encapsulated, and
wherein the clamping device is provided with three or more first rubber anti-slip blocks and three or more second rubber anti-slip blocks, and the three or more first rubber anti-slip blocks and the three or more second rubber anti-slip blocks are respectively arranged in a polygon pattern.

5. An encapsulation mold, comprising:
an upper mold;
a lower mold; and
a clamping device which comprises a first rubber anti-slip block fixed to a joint surface of the upper mold and a second rubber anti-slip block fixed to a joint surface of the lower mold,
wherein the first rubber anti-slip block has a first surface and the second rubber anti-slip block has a second surface, and when the upper mold is pressed against the lower mold, the first rubber anti-slip block and the second rubber anti-slip block overlap at least in part, and a minimum distance between the first rubber anti-slip block and the second rubber anti-slip block is less than a thickness of a glass to be encapsulated,
wherein the clamping device further comprises a third rubber anti-slip block fixed to the joint surface of the upper mold, and a fourth rubber anti-slip block fixed to the joint surface of the lower mold, and
wherein a width of the third rubber anti-slip block and a width of the fourth rubber anti-slip block are less than that of the first rubber anti-slip block and that of the second rubber anti-slip block, respectively, and
wherein the third rubber anti-slip block has a third surface which is adapted for clamping the glass to be encapsulated, and the fourth rubber anti-slip block has a fourth surface which is adapted for clamping the glass to be encapsulated, and
wherein the third rubber anti-slip block has a third groove formed on the third surface; and the fourth rubber anti-slip block has a fourth groove formed on the fourth surface, and
wherein when the upper mold is pressed against the lower mold, the third rubber anti-slip block and the fourth rubber anti-slip block overlap at least in part, and a distance between the third surface of the third rubber anti-slip block and the fourth surface of the fourth rubber anti-slip block is less than the thickness of the glass to be encapsulated; and the third rubber anti-slip block is located closer to an edge of the upper mold compared with the first rubber anti-slip block, and the fourth rubber anti-slip block is located closer to an edge of the lower mold compared with the second rubber anti-slip block, and
wherein the clamping device has equal numbers of the third rubber anti-slip blocks and the fourth rubber anti-slip blocks.

6. The encapsulation mold according to claim 5, wherein when the upper mold is pressed against the lower mold, the distance between the third surface of the third rubber anti-slip block and the fourth surface of the fourth rubber anti-slip block is about 0.15 mm to about 0.25 mm less than the thickness of the glass to be encapsulated.

7. The encapsulation mold according to claim 5, wherein the clamping device is provided with three or more third rubber anti-slip blocks and three or more fourth rubber anti-slip blocks, and the three or more third rubber anti-slip blocks and the three or more fourth rubber anti-slip blocks are respectively arranged in a polygon pattern.

8. The encapsulation mold according to claim 5, wherein the third groove and the fourth groove respectively have a substantially V-shaped, square or W-shaped cross section.

9. The encapsulation mold according to claim 1, wherein the first rubber anti-slip block is provided with a rubber bump located on and extending from the first surface, and the second rubber anti-slip block is provided with a rubber bump located on and extending from the second surface, and wherein
the minimum distance between the first rubber anti-slip block and the second rubber anti-slip block equals to a distance between the surface of the rubber bump of the first rubber anti-slip block and the surface of the rubber bump of the second rubber anti-slip block, and wherein
when the upper mold is pressed against the lower mold, the first rubber anti-slip block and the second rubber anti-slip block overlap completely, the rubber bump of the first rubber anti-slip block and the rubber bump of the second rubber anti-slip block overlap at least in part, and the distance between the first surface of the first rubber anti-slip block and the second surface of the second rubber anti-slip block equals to the thickness of the glass to be encapsulated.

10. The encapsulation mold according to claim 9, wherein the first rubber anti-slip block has a first groove formed on the first surface, and the second rubber anti-slip block has a second groove formed on the second surface; and the rubber bump of the first rubber anti-slip block is embedded in the first groove and extends higher than the first surface, and the rubber bump of the second rubber anti-slip block is embedded in the second groove and extends higher than the second surface.

11. The encapsulation mold according to claim 10, wherein the rubber bump embedded in the first groove extends about 0.45 mm to about 0.55 mm higher than the first surface, and the rubber bump embedded in the second groove extends about 0.45 mm to about 0.55 mm higher than the second surface.

* * * * *